of the water-in-oil type, which consists in subjecting the emulsion to the action of a demulsifier comprising an acylated and oxyalkylated derivative of 5-amino-1,3-dioxanes having the structural formula:

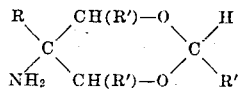

wherein R is a member of the class consisting of hydrogen, alkyl, and alpha-hydroxyalkyl, R' is a member of the class consisting of hydrogen, alkyl, aryl, and furyl; and having at least one acyl radical derived from a detergent-forming monocarboxy acid having at least 8 and not more than 32 carbon atoms and at least one occurrence of the monovalent radical $(OC_nH_{2n})_mH$, wherein $n$ is 2 at 10, and $m$ is 3 to 20.

2. The process of claim 1, wherein the detergent-forming monocarboxy acyl radical is a higher fatty acid acyl radical.

3. The process of claim 1, wherein the detergent-forming monocarboxy acyl radical is a higher fatty acid radical having 18 carbon atoms.

4. The process of claim 1, wherein the detergent-forming monocarboxy acyl radical is an unsaturated higher fatty acid acyl radical having 18 carbon atoms.

5. The process of claim 1, wherein the detergent-forming monocarboxy acyl radical is an unsaturated higher fatty acid acyl radical having 18 carbon atoms and wherein $n$ is at least 2 and not over 4.

6. The process of claim 1, wherein the detergent-forming monocarboxy acyl radical is an unsaturated higher fatty acid acyl radical having 18 carbon atoms and wherein $n$ is at least 2 and not over 4 and at least one occurrence of RCO being part of an amide radical.

7. The process of claim 1, wherein the detergent-forming monocarboxy acyl radical is an unsaturated higher fatty acid acyl radical having 18 carbon atoms and wherein $n$ is at least 2 and not over 4 and at least one occurrence of RCO being part of an ester radical.

8. The process of claim 1, wherein the detergent-forming monocarboxy acyl radical is an unsaturated higher fatty acid acyl radical having 18 carbon atoms and wherein $n$ is at least 2 and not over 4 and at least one occurrence of RCO being part of an ester radical and at least one occurrence of RCO being part of an amide radical.

MELVIN DE GROOTE.

Patented May 8, 1945

2,375,537

UNITED STATES PATENT OFFICE 2,375,537

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application December 10, 1943, Serial No. 513,782

6 Claims. (Cl. 252—340)

This invention relates primarily to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of my invention is to provide an economical and rapid process for separating emulsions which have been prepared under controlled conditions from mineral oil, such as crude oil and relatively soft waters or brines. Controlled emulsion and subsequent demulsification under the conditions just mentioned, is of significant value in removing impurities, particularly inorganic salts, from pipe line oil.

Demulsification, as contemplated in the hereto appended claims, includes the preventive step of commingling the demulsifier with an aqueous component, which would or might subsequently become either phase of the emulsion, in absence of such precautionary measure.

The compounds herein contemplated as demulsifiers, consist of reaction products obtained by the oxyalkylation of the reaction product derived by reacting a member of the group consisting of ricinoleic acid, polyricinoleic acid and their esters, with a member of the group consisting of aldehydes and ketones.

The reaction between unsaturated fatty acids, hydroxy fatty acids, unsaturated hydroxy fatty acids and their esters on the one hand, and aldehydes and ketones on the other hand, appears to be one of acetalization. As to the manufacture of acetals of ricinoleic acid, castor oil, diricinoleic acid, polyricinoleic acid, and the like, reference is made to the process described in detail in German Patent No. 226,222, dated September 27, 1910, to Farbwerke Vorm. Meister Lucius & Bruning in Hochst A. M. It is known that an acetal-type product of hydroxylated unsaturated fatty acids, as exemplified by ricinoleic acid, is susceptible to gaseous oxidation with the production of a resultant product of desirable characteristics. Similarly, I have found that such acetalized products are also susceptible to oxyalkylation with the formation of resultants of unusual properties, and very effective for use in demulsification of crude oil emulsion of the water-in-oil type.

Attention is directed to the various aldehydes indicated in said aforementioned patent as being suitable for use in the process therein described. I have found that the lower molecular weight aldehydes, such as formaldehyde, acetaldehyde, butyraldehyde, and the like, to be most desirable. One may, of course, employ hydroxyaldehydes, such as aldol or cyclic aldehyde, such as benzaldehyde, furfuraldehyde, etc. Generally speaking, my preference is to use formaldehyde. Furthermore, it is known that ketones, particularly the simpler ketones, such as acetone, ethyl methyl ketone, diethyl ketone, and the like, will also produce acetals, but with lower yields and slower reaction velocity than aldehydes. Thus, although ketones, particularly acetone, may be employed, it is decidedly more advantageous to use an aldehyde, particularly formaldehyde.

ACETAL-TYPE PRODUCT

Example 1

A kilogram of ricinoleic acid is treated with 250-500 grams of 40% formaldehyde solution, adding the formaldehyde solution little by little at 20° C., and stirring while the addition takes place. When all of the aldehyde solution is added, the mixture is saturated with hydrochloric acid gas. The saturated mass is stirred for approximately 24-48 hours, adding additional hydrochloric acid so that a maximum amount is present at all times. At the end of this reaction period, the reaction product is stirred with an equal volume of a solution of sodium sulfate of approximately 10% strength. The mixture is allowed to separate and the aqueous portion withdrawn. The acetalized product is then given two subsequent washes with hot water, so as to remove all or substantially all traces of hydrochloric acid. The product is then heated to a temperature of about 70° C. and dried carbon dioxide gas passed through to remove any remaining traces of hydrochloric acid, as well as any moisture which may be present. The product thus obtained may be conveniently designated as an acetal of ricinoleic acid.

ACETAL-TYPE PRODUCT

Example 2

Castor oil is substituted for ricinoleic acid in the previous example. Needless to say, in the presence of hydrochloric acid, at least part of the oil is decomposed into ricinoleic acid or polyricinoleic acid. Possibly during the hydrolytic step, monoricinolein or diricinolein is also formed. Furthermore, it may be that the glycerol liberated forms an acetal-type complex product with one or more of the previously indicated ricinoleic acid bodies and the reactant, formaldehyde.

ACETAL-TYPE PRODUCT
Example 3

Acetone is substituted for formaldehyde in Example 1.

ACETAL-TYPE PRODUCT
Example 4

Acetone is substituted for formaldehyde in Example 2.

In many instances acetalization or condensation involving a methylene bridge can be accomplished more readily by means of trioxane, rather than formaldehyde, or some other formaldehyde polymer. The reaction rate can be controlled to a marked degree by varying the amount of catalyst such as aluminum chloride, zinc chloride, etc. See "Chemical & Engineering News," August 10, 1943, page 1250.

It will be noted that the products of the kind previously described have been referred to as acetals or acetal-type. A study of the reaction involving formaldehyde and ricinoleic acid under conditions described, indicates that the alcoholic hydroxy disappears to a greater or lesser degree, and apparently the product formed is an acetal, which may be indicated in a general way by the following formula:

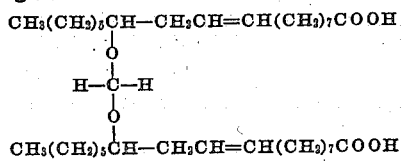

The central methylene radical naturally is a residual radical derived from formaldehyde; and in event some other aldehyde would be employed, the residual radical would be

in which R represents the hydrocarbon or hydroxyhydrocarbon radical derived from the aldehyde employed, such as acetaldehyde, aldol, crotonaldehyde, etc. Similarly, if a ketone would be employed, the central radical would appear thus:

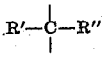

in which R' and R" represent radicals derived from the ketone employed, such as methyl radicals, ethyl radicals, etc.

However, it is probable that even when one starts with ricinoleic acid, actually the dibasic acid produced by the formation of the acetal combines with the unreacted hydroxy acid, such as ricinoleic acid, and that actually one might build up a more complex structure than the simple one indicated above. Furthermore, reference to the aforementioned German patent reveals the fact that such procedure, i. e., the reaction with an aldehyde, such as formaldehyde, in presence of a strong mineral acid, such as hydrochloric acid, or sulfuric acid, may take place with an ordinary unsaturated fatty acid, such as oleic acid. Without attempting to point out hypothetical reactions by which such reactions can take place, it is sufficient to indicate that if one assumes a hypothetical hydration of oleic acid, it simply means a conversion into hydroxystearic acid; and naturally, in view of what has been said previously, a saturated hydroxy acid would react to form an acetal just as readily as an unsaturated hydroxy fatty acid.

Another explanation is that a hydrogen atom attached to a carbon atom immediately adjacent to an ethylene linkage is activated by such ethylene linkage, and thus becomes reactive under the conditions described. Plausibility is lent to this explanation by the somewhat analogous reaction between maleic anhydride and oleic acid, without involving the ethylene linkage of the oleic acid. Further emphasis is suggested by the fact that this last mentioned reaction appears to take place more readily with linoleic acid than with oleic acid. The structure of linoleic acid suggests the mutual activation of the hydrogen atoms of the methylene radical situated between the 2 ethylene radicals. However, a consideration of what has just been said indicates that one cannot rule out the possibility that some further complex reactions may take place in the reaction of ricinoleic acid with acetal-forming compounds, for example, in such a manner as to involve the ethylene linkage. For these reasons, it is obvious that one cannot indicate the exact nature of the chemical compounds or compositions of matter obtained and that one must described them in terms of the method of manufacture. Thus, the most convenient terminology is that usually employed, to wit, to refer to the products as acetals or reaction products of the acetal type. To indicate those obtained by means of aldehydes, they will be referred to as acetals of aldehydes; and those obtained by means of ketones will be referred to as ketone acetals. Because the exact nature of the final reaction product is not known, more properly the compositions can be designated as the reaction product of unsaturated hydroxy fatty acid bodies of high molecular weight with ketones or aldehydes, which are acetal-forming compounds containing a reactive carbonyl group.

Having obtained the reaction products of the acetal type in the manner indicated, the next step is to subject such reaction products to the action of an olefine oxide containing a reactive ethylene oxide ring.

As typical examples of applicable oxy-alkylating compounds may be mentioned glycerine epichlorhydrin, glycide alcohol, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc.

It is well known that if triricinolein, preferably in the form of castor oil, is treated with an oxyalkylating agent, particularly ethylene oxide, propylene oxide, butylene oxide, glycidol, or the like, and if one employs a large molecular proportion of the oxyalkylating agent for each mole or occurrence of the ricinoleyl radical, that one can convert castor oil into a water-soluble product. The conventional procedure is well known, and generally speaking, involves nothing more nor less than heating castor oil in the presence of successive small amounts of alkylene oxide or the like, under comparatively low pressures and fairly low temperatures, and usually in the presence of an alkylene catalyst, as, for example, sodium ricinoleate. The temperatures employed are generally above 100° C. and below 200° C. The pressures employed are generally above 100 lbs. gauge and below 300 lbs. gauge pressure. Sometimes oxyalkylation is conducted in a continuous manner by introduction of the ethylene